United States Patent
Valasin

[19]

[11] Patent Number: 6,033,030

[45] Date of Patent: Mar. 7, 2000

[54] ANGULAR LIMITER SPACER FOR SEAT BELT D-RING

[75] Inventor: Anthony Jerome Valasin, Grosse Ile, Mich.

[73] Assignee: Ford Global Technologies, Inc., Dearborn, Mich.

[21] Appl. No.: 09/174,648

[22] Filed: Oct. 19, 1998

[51] Int. Cl.[7] .................................................. A47C 31/00
[52] U.S. Cl. ......................................... 297/483; 280/808
[58] Field of Search .................................. 297/483, 482; 280/808

[56] References Cited

U.S. PATENT DOCUMENTS

| | | |
|---|---|---|
| 4,789,186 | 12/1988 | Andersson . |
| 4,982,982 | 1/1991 | Nishimura . |
| 5,037,135 | 8/1991 | Kotikovsky ............................ 280/808 |
| 5,096,224 | 3/1992 | Murakami et al. .................... 297/483 |
| 5,372,382 | 12/1994 | Whitens . |
| 5,601,311 | 2/1997 | Pfeiffer et al. ........................ 280/808 |
| 5,732,974 | 3/1998 | Sayles . |

FOREIGN PATENT DOCUMENTS 2726683  4/1979  Germany ............................... 280/808

*Primary Examiner*—Anthony D. Barfield
*Attorney, Agent, or Firm*—David B. Kelley

[57] ABSTRACT

An automotive seat belt webbing guide assembly having an angular limiter spacer for limiting the rotation of a seat belt D-ring. A predefined rotational range assures that the belt webbing will not bind within the D-ring slot, yet the available rotation is sufficient to meet the needs of an automotive occupant and their differing angular pulls of the belt.

9 Claims, 2 Drawing Sheets

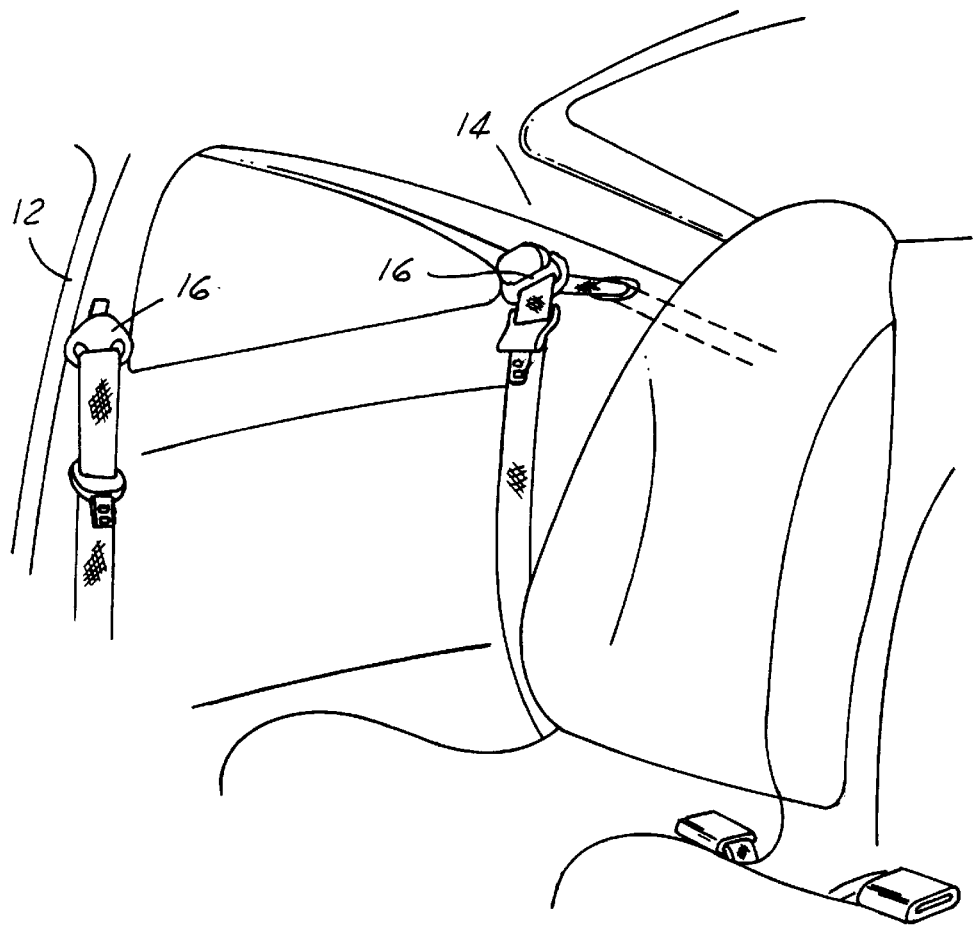
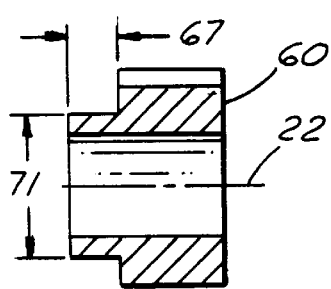
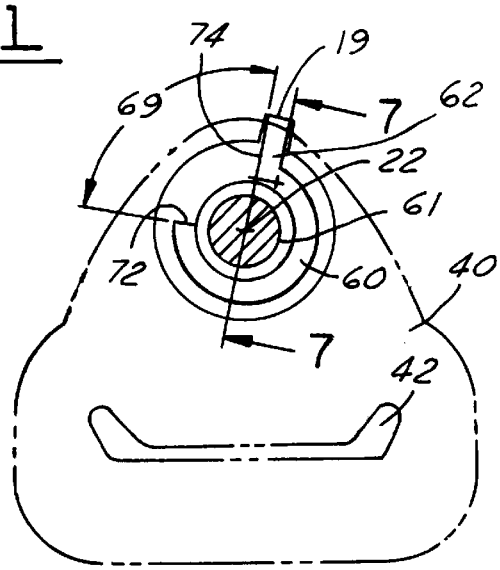
FIG. 1
FIG. 7
FIG. 6

ANGULAR LIMITER SPACER FOR SEAT BELT D-RING

FIELD OF THE INVENTION

This invention relates to an automotive seat belt webbing guide assembly. More particularly, this invention relates to a pivoting D-ring subassembly whose pivoting action is restricted by the utilization of an angular limiter spacer.

BACKGROUND OF THE INVENTION

It is known to construct overhead seat belt webbing guide assemblies. These assemblies typically comprise a D-ring, or plate, rigidly secured to an overhead, or an over-shoulder vehicle structure. The D-ring further has a slot which receives and guides a webbing or belt material. It is also known that a D-ring can be rotationally mounted, so that the D-ring rotates a full 360 degrees. Both the rigid design and the fully rotational design have their problems. For rigid applications, when a vehicle occupant pulls at the webbing, with the intent of guiding it through the slot, the belt may wedge at one end of the slot if the angular difference between the slot position and the occupant's pull is too great. For fully rotational applications, the webbing has the potential of looping over upon itself, thereby, once again, snagging within the slot.

The present invention utilizes a D-ring subassembly which rotates within a predefined range about a pin. By rotating, the D-ring conforms to the angular pull of the user, thereby, assuring the webbing will not wedge. In addition, this rotation is limited within a predefined range so that the webbing will not loop over upon itself and snag. This predefined pivotal action is limited by the interaction of an angular limiter spacer with the D-ring subassembly.

SUMMARY OF THE INVENTION

Accordingly, the present invention relates to an automotive seat belt webbing guide assembly which serves to guide a belt webbing over a vehicle occupant's shoulder. The assembly has a D-ring subassembly, an angular limiter spacer and a pin for rigid mounting to a vehicle structure. The webbing is guided through a slot in the subassembly. The D-ring subassembly can also rotate about the pin along a rotational axis, but only within a predefined range. This rotational limitation is provided by the combination of an angular limiter spacer a D-ring subassembly. The spacer is mounted stationary upon the pin and has two striking surfaces which extend radially and axially about a rotational axis. The D-ring subassembly further has a rigid projection which rotates with the D-ring subassembly, and strikes the striking surfaces of the spacer.

Thus, an advantage of the present invention is a D-ring subassembly which rotates in order to match the angular pull of the webbing by the vehicle occupant. Since the slot is automatically positioned in relation to the occupant's pull, the webbing will not become wedged at either end of the slot.

Another advantage of the present invention is the limitation of the rotation. Since the D-ring subassembly cannot rotate a full 360 degrees, the webbing is not capable of looping over upon itself. Since the webbing cannot loop, it cannot become snagged within the D-ring slot.

BRIEF DESCRIPTION OF THE DRAWINGS

These and other objects, advantages, and features of the present invention will be apparent to those skilled in the vehicle arts upon reading the following description with reference to the accompanying drawings, in which:

FIG. 1 shows an over-shoulder seat belt webbing guide assembly for both the front and rear seat applications;

FIG. 6 shows a cross sectional view of the angular limiter spacer and a pin, perpendicular to the rotational axis; and FIG. 7 shows a close-up cross sectional view of the angular limiter spacer, along line 7—7 of FIG. 6.

DETAILED DESCRIPTION OF THE PREFERRED EMBODIMENTS

Figure 2:
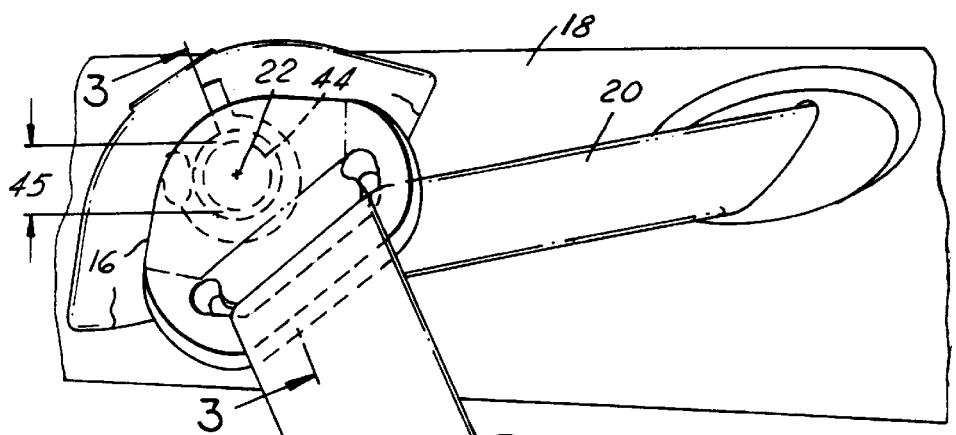
FIG. 2 shows a close-up view of the over-shoulder seat belt webbing guide assembly in an unbuckled position.

Referring now to FIG. 1 of the drawings, an automotive seat belt webbing guide assembly is utilized in either front seat application 12 or rear seat application 14. Both applications have a D-ring subassembly 16. As shown in FIG. 2, the D-ring subassembly 16 of the present invention is pivotally mounted to vehicle structure 18 by way of pin 30 and spacer 60, FIG. 3. The pivotal action of D-ring subassembly 16 prevents seat belt webbing 20 from binding within D-ring slot 42 as belt webbing 20 travels through slot 42.

Figure 3:
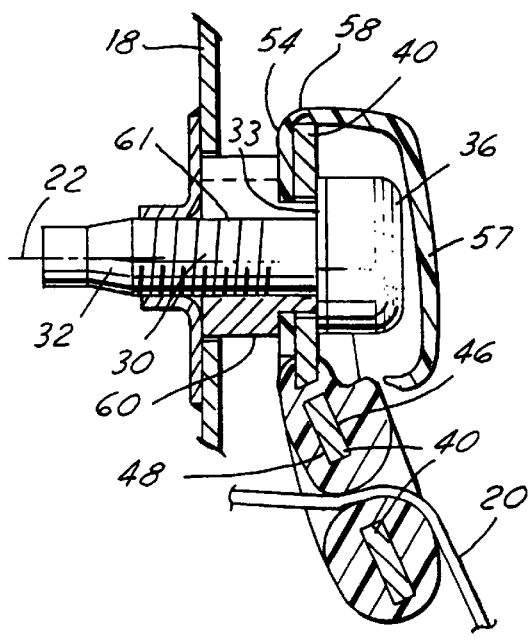
FIG. 3 shows a cross-sectional view of the webbing guide assembly, along line 3—3 of FIG. 2.

As further depicted in FIG. 3, the D-ring subassembly 16 is comprised of a D-ring 40, D-ring cover 50 and projection 52. Pin 30, about which the D-ring subassembly 16 pivots is concentrically located about rotational axis 22. Pin 30 is comprised of attachment end 32, journal mid-section 34, and head end 36. The diameter of end 36 is greater than the diameter of mid-section 34 thereby forming a bottom annular surface 33. Per FIGS. 1, 3, & 4, D-ring 40 has top surface 46, bottom surface 48, slot 42 for receiving belt webbing 20, and aperture 44 concentrically located about rotational axis 22. Top surface 46 faces and pivots against bottom annular surface 33 of pin 30.

Referring to FIG. 3, D-ring cover 50 of subassembly 16 has bottom portion 54, top portion 57, and living hinge 58. Addressing FIG. 4, bottom portion 54 further comprises exterior side 55 and interior side 56. Interior side 56 faces bottom surface 48 of D-ring 40. Bottom portion 54 is rigidly secured to D-ring 40. This rigidity may be accomplished by a variety of means, should cover 50 be formed of plastic, at least one locking tab 59 can be molded to interior side 56 where at least one clip snaps about outer edge 41 of D-ring 40. With cover 50 rigidly secured to D-ring 40, top portion 57 may then be pivoted about living hinge 58, encapsulating D-ring 40, then fastening or snapping shut (not shown) onto itself.

As shown in FIGS. 3 & 6, spacer 60 mounts concentrically about pin 30 and is axially located between the vehicle structure 18 and bottom portion 54. Spacer 60 comprises an internal sleeve surface 61 which conforms about mid-section 34 of pin 30. Spacer 60 further comprises key end 62 which fits into key-hole receptacle 19 stamped or cut into vehicle structure 18. The irregular shape of key end 62 prevents rotational movement of spacer 60 about rotational axis 22 in relation to vehicle structure 18. Continuing with FIG. 4, spacer 60 has a second end 63 which is comprised of exterior annular surface 64, end annular surface 65, and journal sleeve 66. The exterior annular surface 64 and the end annular surface 65 are parallel to one another and concentrically perpendicular to the rotational axis 22.

Figure 4:
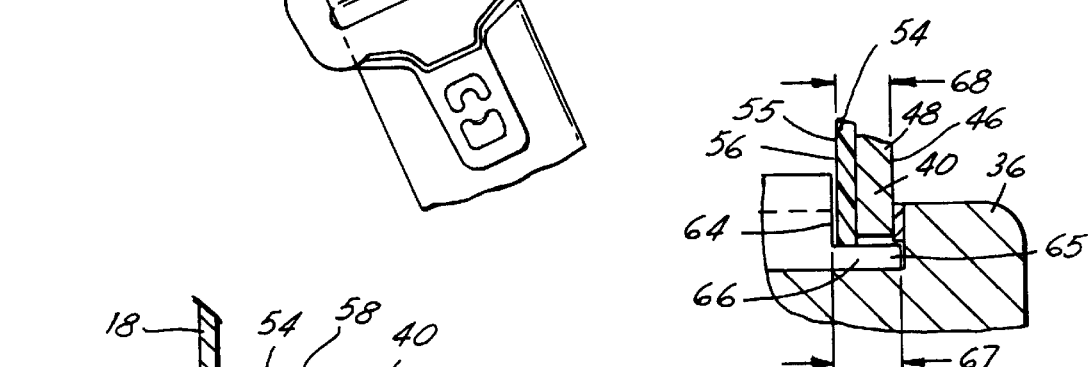
FIG. 4 shows a partial close-up cross-sectional view of a journal sleeve from FIG. 3.

As shown in FIG. 4, journal sleeve 66 has axial length 67 defined by the planar distance between the exterior annular surface 64 and the end annular surface 65. Axial length 67 is substantially near, but greater than, the combined thickness 68 of D-ring 40 and bottom portion 54. In addition, journal sleeve 66 has journal sleeve diameter 71 which is substantially near, but less than, aperature diameter 45, see FIGS. 2 & 7. These differences provide the necessary clearances so that D-ring subassembly 16 is free to pivot about journal sleeve 66 and between exterior annular surface 64 and bottom annular surface 33, see FIG. 3.

Referring to FIG. 6, angular limiter spacer 60 further comprises a first striking surface 72 and a second striking surface 74 whose angular distance apart, relative to the rotational axis 22, is pivoting range 69. Striking surfaces 72 and 74 extend radially outward from rotational axis 22 and may or may not propagate the entire axial length of spacer 60. One sufficiently skilled in the art will understand that if striking surfaces 72 & 74 extend the entire axial length of spacer 60, range 69 must be substantially less than 180 degrees. Surfaces 72 & 74 are struck by projection 52, see FIG. 3, which extends substantially perpendicular from, and is rigidly attached to, the exterior side 55 of bottom cover 54 of the subsequently restricted, pivoting D-ring subassembly 16.

Figure 5:
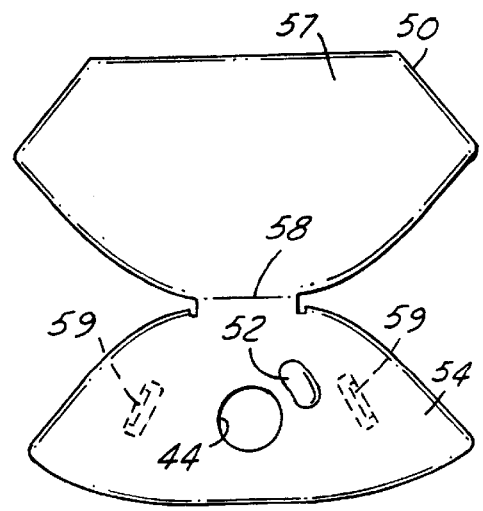
FIG. 5 shows a D-ring cover in an unfolded position from the external sides.

As an alternative to using at least one locking tab 59, see FIG. 5, to rigidly attach D-ring 40 to D-ring cover 50, projection 52 can be rigidly attached to bottom surface 48 instead of exterior side 55. Projection 52 can then penetrate through, and project beyond (not shown), bottom cover 54, in order to engage striking surfaces 72 & 74 as D-ring subassembly 16 pivots.

Furthermore, numerous means exist to secure pin 30 to vehicle structure 18. Pin 30 may take the form of a threaded bolt which threads into vehicle structure 18, or, pin 30 can be spot welded to structure 18 itself.

Although the preferred embodiments of the present invention have been disclosed, various changes and modifications may be made thereto by one skilled in the art without departing from the scope and spirit of the invention as set forth in the appended claims.

I claim:

1. A vehicle seat belt webbing guide assembly with a fixed range of rotation, the assembly comprising:

a pin defining a rotational axis and adapted to rigidly project from an over-shoulder vehicle structure;

a D-ring subassembly pivotally secured about said pin, said subassembly including a rigid D-ring, a D-ring cover having a top portion, a bottom portion adapted to be interposed between the vehicle structure and said D-ring, and a living hinge interconnecting said top portion and said bottom portion whereby said top portion pivots about said hinge to completely encapsulate a portion of said D-ring, and an aperture extending through said D-ring and said bottom portion;

a one piece, solid body, angular limiter spacer mounted concentrically about said pin; said spacer having a tubular main body portion defined between a first exterior annular surface for abutting the vehicle structure and a second exterior annular surface abutting said bottom surface of said D-ring cover, a tubular journal sleeve extending integrally from said second exterior annular surface through said aperture to an end annular surface for providing axial positioning and rotational movement of said D-ring assembly on said pin; and a rotational limiter for limiting the rotational movement of said D-ring subassembly about said pin within a fixed and predetermined pivoting range, said rotational limiter including a recessed notch along the axial length of said main body portion of said spacer extending between first and second striking surfaces and a projection extending from said D-ring subassembly into said notch for engaging each of said first and second striking surfaces to limit the rotational movement of said D-ring subassembly about said pin.

2. A vehicle seat belt webbing guide assembly as set forth in claim 1 wherein said main body portion of said spacer has a first outer diameter and said journal sleeve has a second outer diameter smaller than said first outer diameter.

3. A vehicle seat belt webbing guide assembly as set forth in claim 2 wherein said angular limiter spacer further includes an outwardly projecting key end for mating with a key hole receptacle on the vehicle structure thereby preventing rotational misalignment of said first and second striking surfaces of said spacer defining said pivoting range.

4. A vehicle seat belt webbing guide assembly as set forth in claim 3 wherein said key end projects outwardly from said main body portion of said spacer forming a portion of one of said first and second striking surfaces.

5. A vehicle seat belt webbing guide assembly as set forth in claim 4 wherein said D-ring subassembly includes a slot passing through said D-ring for slidably receiving and guiding a seat belt webbing.

6. A vehicle seat belt webbing guide as set forth in claim 5 wherein said bottom portion of said D-ring cover includes an exterior surface for mounting and supporting said projection between said first and second striking surfaces and an interior surface having at least one locking tab for securing said bottom portion to said D-ring.

7. A vehicle seat belt webbing guide assembly as set forth in claim 6 wherein said pin includes a first distal end for being received by an opening in the vehicle structure, a threaded body for fixedly securing said pin to the structure and a bolt head encapsulated between said D-ring and said top portion of said D-ring cover.

8. A vehicle seat belt webbing guide assembly as set forth in claim 7 wherein said end annular surface of said journal sleeve abuts said bolt head and a portion of said D-ring and said bottom portion of said D-ring cover are rotationally interposed between said bolt head and said second exterior annular surface of said spacer.

9. A vehicle seat belt webbing guide assembly as set forth in claim 8 wherein said D-ring cover is plastic.

* * * * *